May 28, 1940.  D. T. BROCK ET AL  2,202,330
CAMSHAFT
Filed Jan. 27, 1938   2 Sheets-Sheet 1
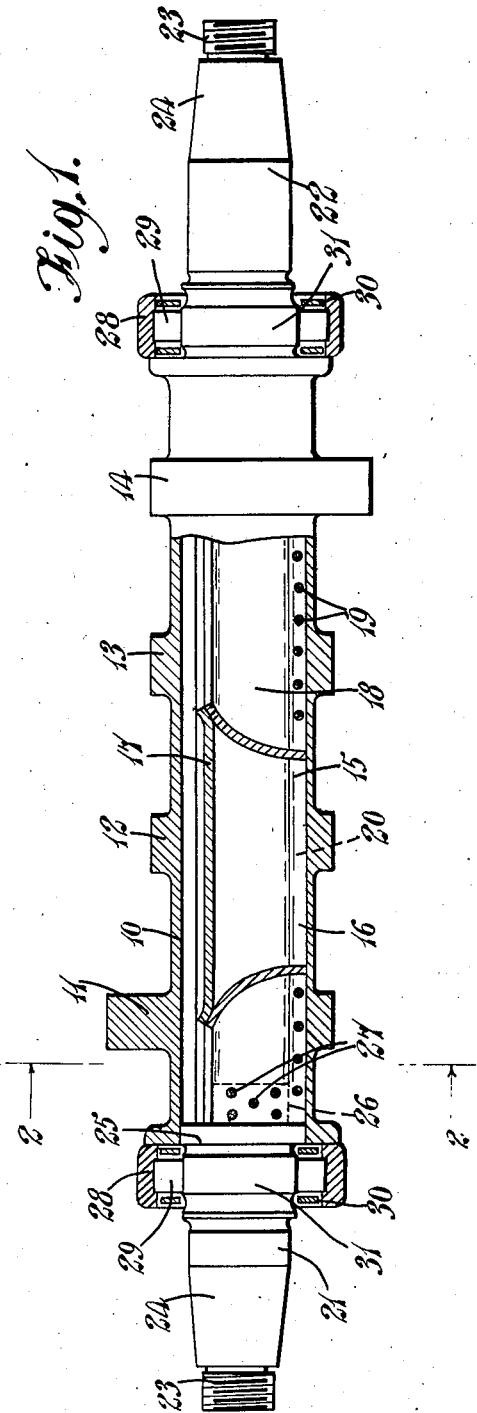
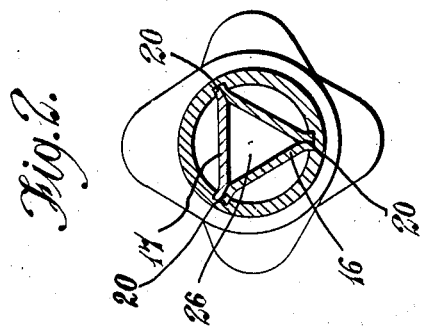
Inventors
Denis T. Brock
George J. Trapp
by
Atty.

May 28, 1940.　　D. T. BROCK ET AL　　2,202,330
CAMSHAFT
Filed Jan. 27, 1938　　2 Sheets-Sheet 2
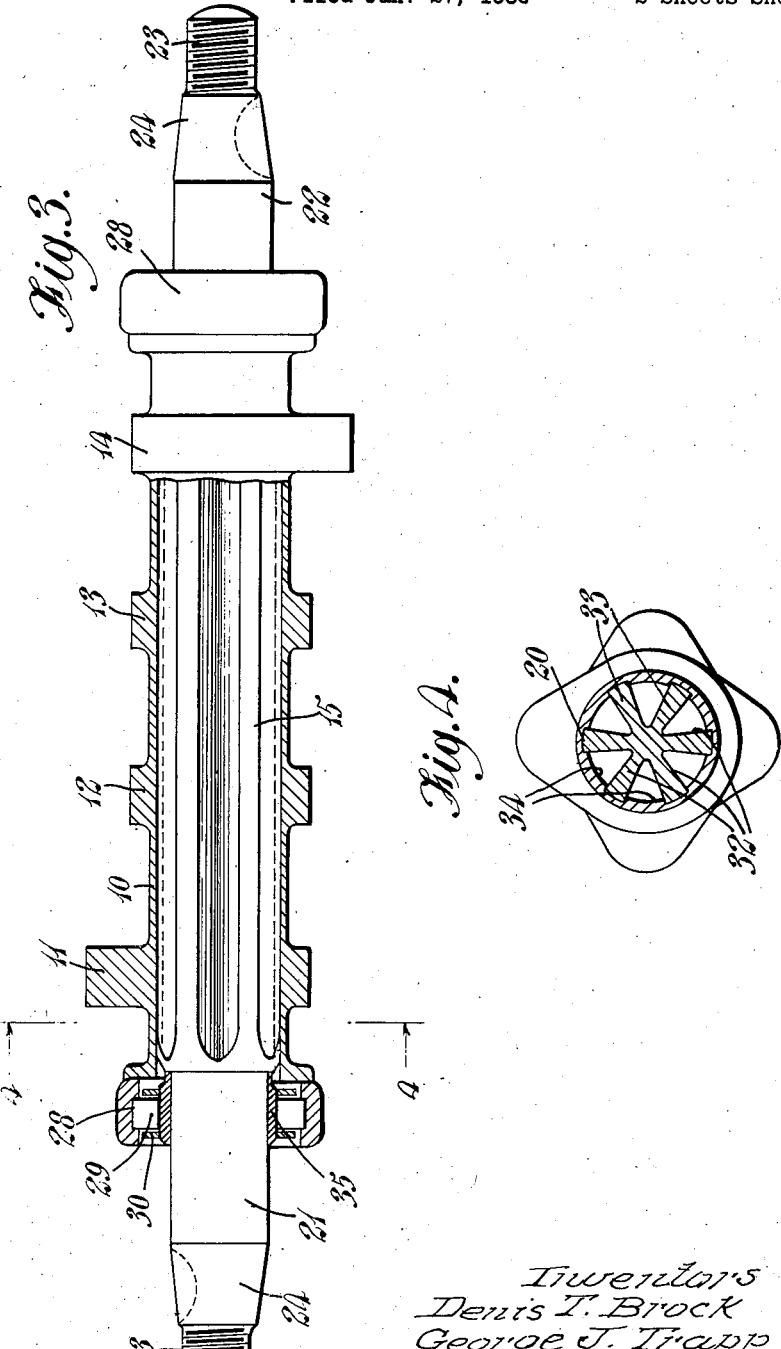
Inventors
Denis T. Brock
George J. Trapp Patented May 28, 1940

2,202,330

UNITED STATES PATENT OFFICE 2,202,330

CAMSHAFT

Denis Tabor Brock and George Joseph Trapp, London, England, assignors to Automotive Products Company Limited, London, England Application January 27, 1938, Serial No. 187,272
In Great Britain January 27, 1937

2 Claims. (Cl. 74—567)

This invention relates to driving shafts, such for example as camshafts, and it has for its primary object to provide an improved method of construction which is of particular service where the finished article is required to be relatively light in weight. It is especially applicable to the camshafts of single and multi-cylinder fuel injection pump units, as in this practical application any saving in weight which can be effected is an advantage, particularly when the injection pump is intended for use on aircraft.

According to the present invention a driving shaft for the transmission of mechanical power is tubular in form, and is provided for substantially the whole of its length with a supporting core which is composed of a light material or which takes the form of a sheet metal or other relatively light structure capable of imparting torque to the tubular outer member along substantially the whole of the length of the latter.

In particular, the invention provides a camshaft comprising a tubular outer member carrying the cam or cams, and an internal core which extends substantially the whole length of the outer member and is in positive driving connection therewith along substantially the whole length of said outer member. The improved camshaft can thus comprise a tubular outer member which is formed in its bore with longitudinal splines, and an internal core which extends substantially the whole length of said outer member, said core being arranged to engage with the splines so as to form a driving connection extending for substantially the whole length of the outer member. The core can conveniently comprise a rod, the shape of the cross-section of which is materially different from that of the space within the outer member, one or more air spaces thus being formed with a view to reducing the total weight of the camshaft. Thus, the core may be formed with deep grooves of substantially triangular cross-section, the mouth portions of which grooves are occupied by splines formed on the interior of the outer member, while in an alternative construction the core is non-circular in cross-section and is formed from sheet metal. Thus, the core may be substantially triangular in cross-section, the longitudinal edges at the corners of the triangle being arranged to engage with grooves formed longitudinally in the interior of the outer member. Where a sheet metal construction of core is used that part thereof disposed within the outer member is preferably formed separately from an end portion through which torque is imparted to or by the camshaft, the said end portion being secured to the remainder of the core, for instance by welding.

As a further feature the invention provides a multi-cylinder fuel injection pump having a camshaft of the improved construction.

The invention is illustrated in the accompanying drawings in which

Figure 1 is a side elevation of a camshaft, the view being partly in section to show the interior construction;

Figure 2 is an end sectional elevation taken on the line 2—2 of Figure 1; and

Figures 3 and 4 are corresponding views showing a modified construction of camshaft, the section in Figure 4 being taken on the line 4—4 of Figure 3.

Referring firstly to Figures 1 and 2 the construction of camshaft shown therein is particularly intended for use in a four-cylinder fuel injection pump for an internal combustion engine, and comprises an outer tubular member 10 which is formed on its exterior with four cams 11, 12, 13 and 14 normally used for operating the respective plungers (not shown) of the fuel injection pump. The interior of the outer member 10 is occupied by a core, which is indicated generally at 15. This is composite in character, its central portion being formed from three strips 16, 17 and 18 of sheet metal, the edges of which are joined together by welding at 19 so as to produce a substantially triangular construction as will be seen in Figure 2. The longitudinal edges of the strips 16, 17 and 18 fit snugly into keyways 20 formed in the interior of the outer member 10, and in this way a driving connection is established between the core and the outer member, said connection extending for substantially the whole length of said outer member. The core also comprises end portions 21 and 22 which are screw-threaded at 23 and tapered at 24 to accommodate the gear wheels or other mechanism (not shown) by which the camshaft is connected to the engine and also the governor mechanism of the injection pump unit. Each of the end portions 21 and 22 is formed with a circular flange 25 which fits snugly within the outer member 10, and also a spigot 26 which is triangular in cross-section so as to connect with the strips 16, 17 and 18. These are preferably welded in position as indicated at 27 so that the core is rendered very rigid and yet light in weight.

It will be seen that a torque imparted to either of the end portions 21 or 22 passes to the triangular portion 16, 17, 18 of the core 15, and is thence distributed along the length of the outer member 10 through the medium of the keyways 20. Thus, the likelihood of overloading any one particular point in the outer member 10 is considerably diminished, and as a consequence the thickness of the metal can be reduced to cut down the weight, as is very desirable in pumps for use with aircraft engines.

The camshaft described is mounted by means of roller bearings, comprises outer fixed races 28 and rollers 29 held in cages 30, and it will be noted that the end portions 21 and 22 of the core 15 are formed with accurately ground tracks 31 which cooperate directly with the rollers 29.

A somewhat modified construction of camshaft is shown in Figures 3 and 4, and in this instance the core indicated at 15 is shaped from a single piece of light metal, such as aluminium or magnesium alloy. As before, the outer member 10 is of tubular form and has integral cams 11—14, but its interior is grooved longitudinally to form six keyways 20 which are equally spaced as shown in Figure 4. The central portion of the core is formed with six deep, substantially triangular grooves 32, thus leaving radial webs 33, the extremities of which slide into the grooves 20 of the outer member 10. Thus, in effect the mouth portions of the grooves 32 are occupied by splines 34 upon the inner surface of the member 10, thus ensuring a well distributed driving connection between the core 15 and said member 10. As before, the end portions 21 and 22 are used for transmitting torque from or to the camshaft and are suitably shaped for this purpose. Roller bearing assemblies 28, 29, 30 are also provided, but in this case an inner race 35 is shrunk or otherwise secured upon each of the end portions 21 and 22, since these latter are composed of light metal which, as at present produced, is insufficiently hard to withstand the action of the rollers 29.

It will be observed that various modifications can be made in the construction of the improved driving shaft and the core in some instances may be of solid cross-section, provided that positive driving means are supplied for transmitting torque between the core and the outer tubular shell. Alternatively, the core may be of triangular, square or other non-fluted shape so as to allow a certain saving in weight, although from practical and theoretical considerations it is at present thought that the triangular cross-section or the star-shaped cross-section having three or more radial fins are the most advantageous forms of core, particularly in view of the fact that they enable heavy torsional loads to be transmitted by shafts which are relatively light.

What we claim is:

1. A camshaft comprising an outer tubular member interiorly formed with a plurality of longitudinal grooves, a plurality of cams formed integrally upon said tubular member at spaced positions along its exterior, a core member, and a plurality of ribs on said core member, which ribs are constituted by a circumferential series of deep longitudinal grooves in the core member, and which have their tip portions in driving engagement with the grooves in the tubular member so that the innermost part of each groove in the core member forms an air cell to lighten the cam shaft, the two ends of each longitudinal groove in the core member being smoothly and progressively decreased in depth so as to increase gradually the cross-sectional area of the core member adjacent the ends of the tubular member, and thus provide increased torsional strength of the core member at these positions.

2. A camshaft comprising an outer tubular member interiorly formed with a plurality of longitudinal grooves, a plurality of cams formed integrally upon said tubular member at spaced positions along its exterior, a core member, and a plurality of ribs on said core member, which ribs are constituted by a circumferential series of deep longitudinal grooves of triangular cross section formed in the core member, said ribs having their tip portions in driving engagement with the grooves in the tubular member so that the innermost part of each groove in the core member forms, for lightening the camshaft, an air cell of substantially triangular cross section, the two ends of each longitudinal groove in the core member being smoothly and progressively decreased in depth so as to increase gradually the cross sectional area of the core member adjacent the ends of the tubular member, and thus provide increased torsional strength of the core member at these positions.

DENIS TABOR BROCK.
GEORGE JOSEPH TRAPP.